United States Patent [19]

Shimizu et al.

[11] Patent Number: 4,562,717
[45] Date of Patent: Jan. 7, 1986

[54] DRAWING PUNCH FOR DRAWING FOIL

[75] Inventors: Keiichi Shimizu, Hikari; Junichi Tanabe, Yanai; Yoshikazu Kondo, Kudamatsu, all of Japan

[73] Assignee: Toyo Kohan Co., Ltd., Tokyo, Japan

[21] Appl. No.: 633,428

[22] Filed: Jul. 19, 1984

[30] Foreign Application Priority Data

Jul. 28, 1983 [JP] Japan .................. 58-136851

[51] Int. Cl.⁴ ............................................. B21D 22/00
[52] U.S. Cl. ........................................ 72/347; 72/348; 72/465
[58] Field of Search ................. 72/465, 347, 348, 349, 72/345

[56] References Cited

U.S. PATENT DOCUMENTS 3,910,095  10/1975  Hortig ................................. 72/345
4,365,498  12/1982  Hirota ................................. 72/465

FOREIGN PATENT DOCUMENTS 56-50645   11/1981  Japan .
1349059     3/1974  United Kingdom .

Primary Examiner—Leon Gilden
Attorney, Agent, or Firm—Wenderoth, Lind & Ponack

[57] ABSTRACT

A drawing punch for use in drawing foils in a die which converges in the direction of drawing. The punch has a rigid core, a cylindrical elastic body on the core and surrounding the core with a cavity therein around the core and opening out of the end of the body facing the direction of drawing. A rigid support member is provided on the core against which the other end of the body is supported. The radial cross-sectional area of the cylindrical elastic body increases from the firstmentioned end of the body toward the other end, and the peripheral surface of the cylindrical elastic body is at a positive angle to the axis of the punch of from 0° to 20°. The cavity has a volume which becomes zero just before the end of the stroke of the punch into the die.

3 Claims, 10 Drawing Figures

DRAWING PUNCH FOR DRAWING FOIL

This invention relates to punch for the drawing of metallic foil, metallic sheet, plastic film, plastic sheet and laminated sheets made of these materials.

More particularly, this invention relates to a punch for drawing various kinds of foils and sheets such as described above in a die which converges in the direction of drawing, the drawing being without wrinkles and with a large drawing ratio.

BACKGROUND OF THE INVENTION

Foils and sheets which have a thickness below 200 mm, when drawn have an elongation which is very low and they are also apt to wrinkle. Therefore the drawing of these foils and sheets is very difficult. However, in the field of packaging of foods, medicines, electric parts and so on, the use of such foils and thin sheets is desirable from the point of economy, light weight, disposability and so on.

They are not used widely because of their poor drawability, however, i.e. because they are apt to wrinkle and can not be drawn with large drawing ratio.

There has previously been disclosed in Japanese patent No. Sho 56-50645 a punch having a rigid core and an elastic body. While that punch is an improvement over a conventional punch having a rigid body, the drawing ratio obtainable with that punch is still relatively low.

The concepts of drawing, including drawing ratio and wrinkle, will be described with reference to FIG. 1 so as to be able to give a clear explanation of the present invention.

The static drawing ratio is the ratio obtained by dividing the initial diameter of the blank by the punch diameter Dp, namely, initial blank diameter/Dp.

On the other hand, from the dynamic point of view, the drawing ratio is the ratio of the strength of the material being drawn to the force required for drawing.

The force required for drawing mainly comprises three kinds of forces.

One is the force required for shrink deformation of the material being drawn on the die face 3. This force is porportional to the blank diameter.

The second is the friction force between the die 3 face and the material being drawn and between the material being drawn and the face of the blank holder 2. The last one is the force for bend working of the material being drawn at the die shoulder. The total of these three forces increases gradually in the early stage of drawing due to the effect of the work hardening of the material being drawn, reaches a maximum about half way through drawing process, and then gradually decreases.

On the other hand, the strength of the material relevant to the drawing ratio is the strength determined by the product of the circumferential sectional area of the material being drawn and the unit tensile strength, namely thickness x circumferential length x unit tensile strength, at a fixed point in the axial direction.

The wall breakage of the foil generally occurs at the point where the strength is minimum. The practical drawing ratio, that is to say the limiting drawing ratio, depends on both the minimum strength of the product and the maximum total drawing force. The minimum thickness of the material being drawn is near the bottom of the material being drawn, namely, near the container bottom in the axial direction of the container, i.e. the drawing direction.

The thickness increases gradually toward the open end of the container.

The material strength varies in the same manner as the change of thickness.

As stated, the maximum drawing force appears at about half way through the drawing process, the minimum point of material strength exists near the container bottom, and the wall breakage generally happens at a point at which the drawing is rather far along and at the portion near the periphery of the container bottom.

There are two types of wrinkles.

One is generated at the flange portion (hereinafter called flange-wrinkles) and the other is generated in the wall portion B (hereinafter called wall-wrinkles).

From the dynamic point of view, it may be said that a wrinkle is a phenomenon which occurs when the holding force perpendicular to the material surface being drawn can not restrain the buckling of the material caused by circumferential compression stress.

Therefore, flange-wrinkles can be restrained by increasing the holding force (hereinafter called blank holder force) between blank holder 2 and die 3.

However, the friction between the blank holder, the die and the material being drawn also increases in accordance with the increase of the blank holder force and as a result wall breakage occurs more readily.

Therefore, it would seem that the initial blank diameter (and hence the static drawing ratio) should be reduced by the equivalent of the blank holder force increment for restraining of wrinkles. However, it is common knowledge that the improvement of wrinkles and drawing ratio can not be simultaneously overcome in this way.

On the other hand, the generation and the degree of wall-wrinkles depend on the clearance between punch 1 and die 3. When the clearance is greater, the wall-wrinkles are heavier.

OBJECT AND BRIEF SUMMARY OF THE INVENTION

It is the object of the present invention to provide a punch use with die having an angle $\theta_1$ which is positive and by the use of which simultaneous improvement of the drawing ratio and reduction or elimination of flange-wrinkles and wall-wrinkles are possible.

This object is achieved by the provision of a drawing punch according to the invention for use in drawing foils in a die which converges in the direction of drawing, comprising: a rigid core; a cylindrical elastic body on said core and surrounding said core, said body having a cavity therein around said core and opening out of the end of said body facing the direction of drawing; a rigid support member on said core against which the other end of said body is supported; the radial cross-sectional area of said cylindrical elastic body increasing from the firstmentioned end of said body toward the other end; the peripheral surface of said cylindrical elastic body being at a positive angle to the axis of said punch of from 0° to 20°; said cavity having a volume which becomes zero just before the end of the stroke of the punch into the die.

BRIEF DESCRIPTION OF THE DRAWINGS

The invention will now be described in connection with the accompanying drawing, in which.

DETAILED DESCRIPTION OF THE INVENTION

Figure 1:
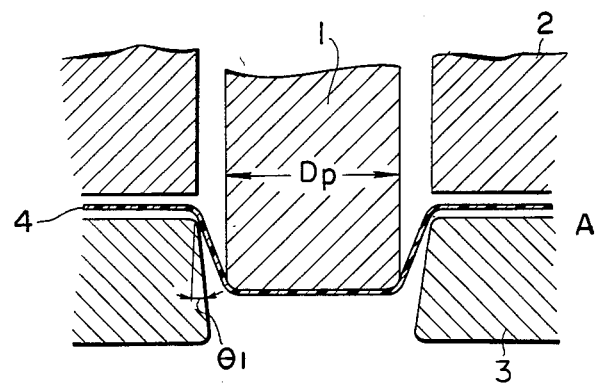
FIG. 1 is a schematic sectional view of a prior art punch during drawing.

The punch according to the invention comprises, as shown in FIGS. 2–5, a cylindrical elastic body 5 having downwardly open cavity 6 in the bottom or tip end thereof, a rigid core 7 extending therethrough, and, if desired, a rigid tool for forming a container bottom on the lower end of core 7. The cavity 6 is here shown as being downwardly divergent.

By forming a punch like this and making the cylindrical elastic body 5 a special shape, as described hereinafter, foils and sheets such as described above can be drawn successfully in a die 3 which converges in the direction of drawing, i.e. has a positive die angle $\theta_1$. The elastic body is of a non-self lubricating rubber or the like, so that friction between the cylindrical elastic body 5 and the inside of the material 4 being drawn can be used during drawing when the cylindrical elastic body 5 is made in the special shape and the cavity is provided.

The ability to eliminate wrinkles increases when the rigid core 7 is provided and the cavity is shaped so that the volume thereof reaches zero just before the end of the drawing stroke.

The effective use of the friction will now be described. In drawing with the rigid punch and rigid die as shown in FIG. 1, friction does not occur between the inside of the material 4 being drawn and the punch, and therefore the limit to the drawing ratio, namely, the limiting drawing ratio, is naturally determined as previously described.

Figure 2:
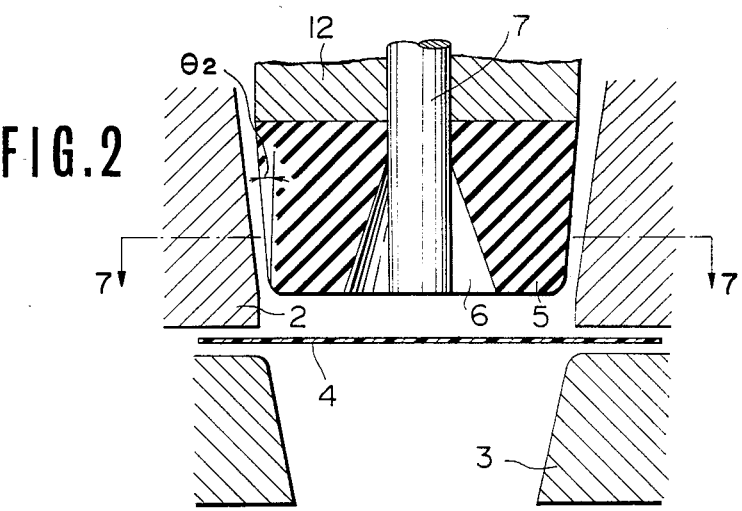
FIG. 2 is a schematic sectional view showing the arrangement of the punch of the present invention before the beginning of the drawing operation.
Figure 3:
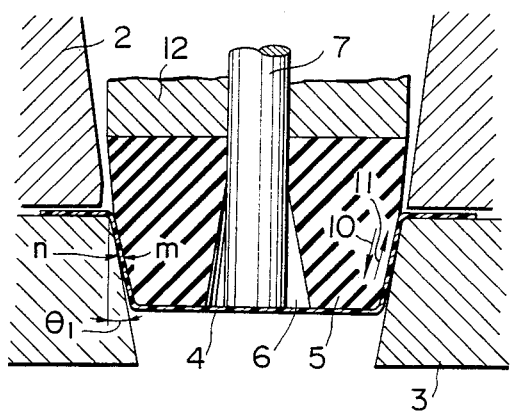
FIG. 3 is a view similar to FIG. 2 showing the parts about half way through the drawing process.
Figure 4:
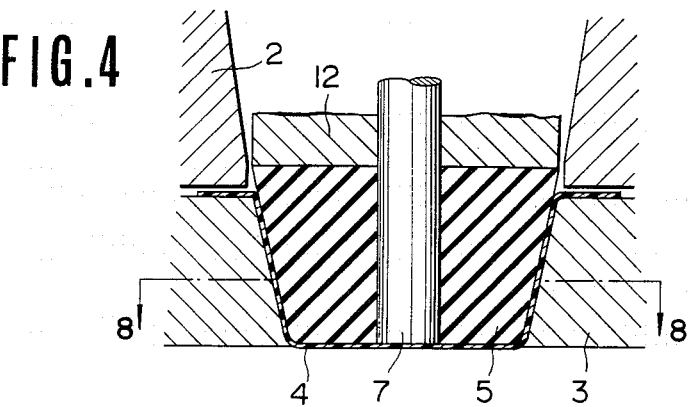
FIG. 4 is a view similar to FIG. 2 showing the parts at the end of the drawing.

However, when the cylindrical elastic body 5 is used in which the outside diameter in the unstressed condition is almost equal to the inside diameter of the mouth of die 3, as shown in FIG. 2, or even slightly larger than that, and where the die angle $\theta_1$ is positive, any point m along the cylindrical elastic body 5 and any point n along the inside of the material 4 being drawn, which points along the wall surface about half way through drawing process are shown in FIG. 3, proceed at different forward velocities.

Therefore, as the drawing proceeds, slippage occurs between point m and point n. As a result, friction acts in the direction of arrow 10 or 11, in accordance with the slip direction, on the inside of the material 4.

When the friction acts in the direction of arrow 10, the burden on the portion of the foil near container bottom periphery where material strength is lowest is reduced, which is effective for the improvement of the drawing ratio.

On the other hand, when the friction acts in the direction of arrow 11, the drawable drawing ratio is reduced.

Figure 6:
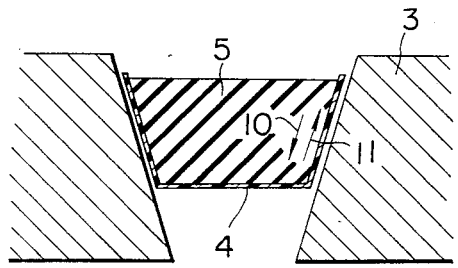
FIG. 6 is a diagram for showing the difference between the rate of drawing of the outside of the cylindrical elastic body and that of the inside of the material being drawn.

The slip between points m and n can be understood more fully from FIG. 6.

As the cylindrical elastic body 5 advances into the cavity of die 3, the length of the material 4 being drawn in the direction of advance, namely the container height, becomes greater since the material 4 is deformed as the surface area is being held almost constant.

Therefore, the forward velocity of the wall section of the material 4 differs corresponding to the position in the axial direction. The tip velocity of the container is fastest and the rear end velocity is slowest. On the other hand, the cylindrical elastic body 5 is deformed while the volume is held almost constant, and the forward velocity differs according to the position in the axial direction.

The relative velocity difference between the material 4 and the cylindrical elastic body 5 changes according to the position in the axial direction, the outside diameter of the cylindrical elastic body 5, die angle $\theta_1$ and so on.

This fact can be confirmed by experiments or calculation.

In order to utilize the friction during actual drawing, it is necessary that the friction work in the direction of arrow 10 on the inside of material 4 in FIG. 3, that is to say, the cylindrical elastic body 5 must advance faster than the wall of material 4. This matter might be considered to be physically impossible.

However, because the velocity of the material wall is slow in proportion to the distance from the tip, the friction can be expected to act if the velocity of the cylindrical elastic body 5 can be kept almost equal to the velocity of the material tip during drawing.

The inventors have investigated in detail the shape of the punch, the constitution of the punch and so on, to determine how this can be achieved. As a result, it has been found that the drawing ratio can be improved by making the cylindrical elastic body 5 in a special shape and providing a cavity 6 within the cylindrical elastic body.

Figure 9:
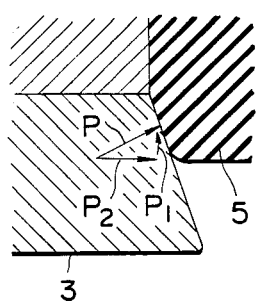
FIG. 9 is a diagram showing the forces acting upon the cylindrical elastic body.

When the cylindrical elastic body 5 advances into the die cavity, the force shown by P in FIG. 9 works perpendicularly to the surface of the cylindrical elastic body 5. The force can be broken down into axial force P1 and radial force P2. Axial force P1 deforms the cylindrical elastic body 5 in the axial direction, and radial force P2 deforms the cylindrical elastic body 5 in the radial direction.

When the cylindrical elastic body 5 advances into a die in which the die angle $\theta_1$ is positive, namely the diameter of the mouth is larger than the inside diameter, there is a different $\Delta V$ between the volume $V_b$ of the material of the elastic body in the uncompressed condition plus the volume of the cavity 6 plus the volume of the rigid core 7 and the volume $V_d$ of the die, which difference volume $\Delta V$ must be absorbed by deformation in the radial or the axial direction.

The deformation to the rear in the axial direction must be avoided in order to achieve utilization of the friction.

It has been found after many experiments that the direction of the deformation is affected considerably by the shape of the cylindrical elastic body and the friction can be utilized sufficiently only where the elastic body has an angle of taper $\theta_2$ in FIG. 2 ranging from 0° to 20°.

Needless to say, the dimension of this angle $\theta_2$ and the volume of the cavity surrounded by the cylindrical elastic body 5 are dependent on each other. Therefore, cavity volume must be just slightly less than this difference volume $\Delta V$ and the size of this angle $\theta_2$ be such that the cavity volume becomes zero just before the end of stroke.

When $\theta_2$ is less than 0°, the deformation of the cylindrical elastic body 5 increases to the rear in the axial direction, and then the friction works unfavorably.

The reason why the upper limit of the angle $\theta_2$ is 20° is not because of the deformability in the axial direction or in the radial direction but because of the dimensional difficulty of drawing. It is because the rear outside diameter of the cylindrical elastic body 5 becomes larger than the inside diameter of the blank holder 2 when $\theta_2$ is greater than 20°.

The purpose of providing the cavity in the bottom of the cylindrical elastic body 5 is to provide more deformation in the radial direction than in the axial direction.

If the cavity 6 is not present, sufficient improvement in the drawing ratio cannot be attained even if the cylindrical elastic body with the tapered outer surface is used for drawing. When the volume of the cavity is determined as described above, i.e. just slightly less than the difference volume $\Delta V$, the wrinkles can be prevented.

If a rigid tool 8 for forming a container bottom is needed, the relative position of the back 14 of the rigid tool 8 and the lower end 13 of the cylindrical elastic body must be determined so that the contact between the back 14 and the tip 13 is not so strong, because strong contact will hinder the deformation of the cylindrical elastic body 5 in the radial direction.

It is absolutely necessary that the cylindrical elastic body 5 be supported so that it is not moved relatively to the rear in comparison with the movement of the tip of the rigid tool 8. For this purpose, a rigid support member 12 is provided which is fixed to the rigid core 7.

The wall thickness of the cylindrical elastic body 5 in the radial direction is determined in consideration of the friction force due to pressure on the inside of the material being drawn, deformability of the cylindrical elastic body 5 in the radial direction versus that in the axial direction, the amount of wrinkle-restraint force at the end of the stroke, ease of stripping of the drawn article from the punch after drawing, and the kind of material being drawn. The radial cross-sectional area of the cylindrical body 5 increases from the lower or tip end toward the other end, and in the embodiment shown the increase is at a uniform rate so that the cavity 6 is conical. Other shapes can, however, be used.

Needless to say, it is necessary that the cylindrical elastic body 5 contacts the die 3 as early as possible during drawing, and therefore it is desirable that the tip diameter of the cylindrical elastic body 5 be almost equal to the diameter of the die mouth.

The purpose of providing the rigid core 7 surrounded by the cavity 6, which is another feature of this invention, will be explained.

The magnitude of the friction force between the cylindrical elastic body 5 and the inside of the material being drawn is proportional to the magnitude of pressure applied to the inside of the material being drawn by the cylindrical elastic body 5, that is to say, proportional to the wall thickness of the cylindrical elastic body 5 in the radial direction.

Therefore, if the friction works in the direction of arrow 10 in FIG. 3 even when the wall thickness is large, it is desirable for the thickness to be large for the improvement of drawing ratio.

However, the deformability in the axial direction in comparison with that in radial direction increases in proportion to the wall thickness of the cylindrical elastic body 5, and the difficulty of stripping the drawn article from the punch also increases. Therefore the wall thickness of the cylindrical elastic body 5 cannot be too great. Therefore, the wall thickness of the cylindrical elastic body which is preferable for the improvement of drawing ratio and stripping is not always the most suitable thickness for wrinkle-restraint. Wrinkles cannot be completely eliminated without providing the rigid core 7.

If the rigid core 7 is provided and the volume of the cavity surrounding the rigid core becomes zero just before the end of the drawing stroke, a powerful pressure in direct proportion to the hardness of the cylindrical elastic body 5 will act on the inside of the material being drawn from the point where the volume of the cavity becomes zero to the end of the stroke, and can eliminate even wrinkles which have already been generated. This can be described dimensionally as follows.

Figure 7:
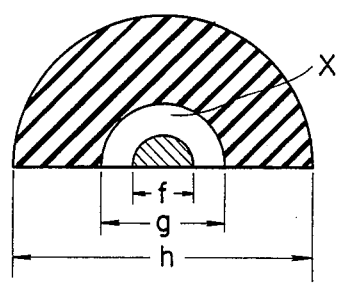
FIG. 7 is a half of a transverse sectional view of the punch as shown in FIG. 2 taken on line 7—7.
Figure 8:
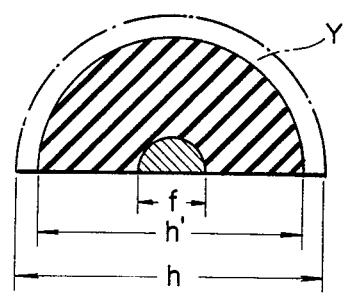
FIG. 8 is a half of a transverse sectional view of the punch as shown in FIG. 4 taken on line 8—8.

By making the area X of the cavity in FIG. 7 a little smaller area than area Y within the dotted line in FIG. 8, i.e. the amount the periphery of the body contracts, the cavity 6 becomes zero just before the end of the stroke. As for the relation between the wall thickness of the cylindrical elastic body 5 and the wrinkle-elimination effect, it is evident from Hooke's law that the wrinkle-elimination effect is in inverse proportion to the wall thickness of the cylindrical elastic body 5 when the volume of the cavity becomes zero. Therefore, while it is most suitable that the wall thickness be small for improvement of drawing ratio and stripping of the drawn article, providing a core is more effective for wrinkle elimination.

Needless to say, because the maximum drawing force has already been passed near the end of the stroke, the point at which the volume of the cavity becomes zero does not influence the drawing ratio.

Figure 5:
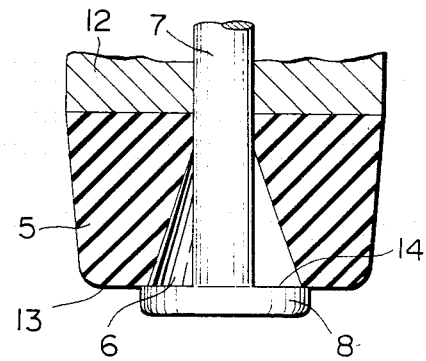
FIG. 5 is a sectional elevation view of the punch having a rigid tool attached for forming a container bottom.

The purpose of providing the rigid tool 8 for forming the container bottom on the rigid core 7 as shown in FIG. 5 will be explained.

In the drawing using the cylindrical elastic body 5 the outside diameter of which is larger than the inside diameter of die 3, stripping of drawn article may become a problem in certain circumstances. Therefore, the rigid tool 8 for forming the container bottom is provided as a supplementary member for improving ease of stripping and for finishing the container bottom with a prescribed dimension.

When the rigid tool 8 is provided, the thickness of the rigid tool should be as small as possible so that the cylindrical elastic body is compressed as early as possible during the drawing process.

It is necessary that the contact between the back 14 of the rigid tool 8 and the tip 13 of the cylindrical elastic body be such as to permit the elastic body to move freely along the back 14 of the rigid tool 8.

From the considerations and studies as described above, an excellent punch for metallic foil and the like can be provided for drawing an article with a large drawing ratio and without wrinkles.

The great difference between this invention and that disclosed in the Japanese patent No. Sho 56-50645 mentioned hereinbefore is that in the Japanese patent, the elastic body and rigid core are connected by adhesive. In the punch of this invention, however, it is required for obtaining effective use of the friction between the punch and the foil that a cavity should be provided between the elastic body and the rigid core, and the elastic body be made in a special shape so that the elastic body can be easily deformed in the radial direction. The punch disclosed in Japanese patent No. Sho 56-50645 can carry out drawing only with a relatively small drawing ratio in comparison with the punch of this invention.

Specific examples are set forth hereinafter in conjunction with Table 1.

Figure 10:
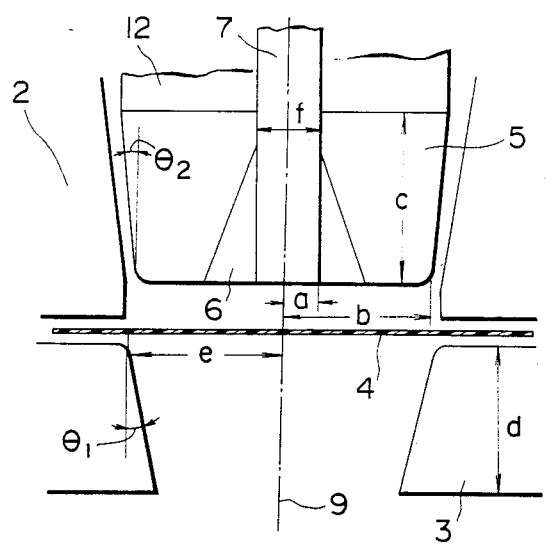
FIG. 10 is a view similar to FIG. 2 in which the dimensions of the drawing punch and die used in experiments are shown.

The dimensions of the punch used for experiments as shown in FIG. 10 were: b=33 mm; c=50 mm; d=30 mm; e=33 mm; f=2 Xa; $\theta_1=8$ deg. The other dimensions $\theta_2$ and a were varied as shown in Table 1, and were used on foils as set forth therein. The drawing ratios and nature of the wall-wrinkles for each punch and each material are given.

The punches all had a rigid tool 8 on the tip of the rigid core 7. The material of blank holder 2, die 3, rigid core 7 was tool steel.

The material of the cylindrical elastic body 5 was urethane rubber having a hardness of 90° in accordance with ASTMD 2240 Durometer A.

The punches which are denoted by No. 1 ~ No. 4 in Table 1 are according to the invention and the punches denoted by No. 5 ~ No. 7 are for comparison.

The volume of the cavity in punches No. 1 ~ No. 4 was made so that it became zero just before the end of the stroke. The superiority or inferiority of the punches is determined by the drawability, namely, the limiting drawing ratio, and the generation of wrinkles.

As is evident from the Table 1, the punches denoted by No. 7 and No. 5 produce only poor results with respect to drawing ratio and wrinkle.

The punch denoted by No. 7 is a rigid tool. The punch denoted by No. 5 is provided with a cavity in the cylindrical elastic body, but the angle $\theta_2$ between the circumferential surface of the cylindrical elastic body and the axis of the drawing punch was minus five degrees (i.e. the outside diameter of the body decreases in the direction from the tip to the rear, or upper end in the drawings).

The punches denoted by No. 6 were provided with an elastic body but not with a cavity therein. These punches denoted were good for wrinkle-restraint but has a low drawing ratio.

However, the punches according to the invention and denoted by No. 1, No. 2, No. 3 and No. 4 simultaneously have improved drawing ratios and good wrinkle restraint. The punches according to the invention are excellent as compared to prior art punches.

The punches according to the invention can of course be used for drawing metallic foils, plastic films, plastic sheets and laminated sheets other than those shown in the examples, and can be used for drawing cross-sectional shapes other than cylindrical.

TABLE 1

| | Dimensions of punch | | | Drawing materials | | Limiting | | |
|---|---|---|---|---|---|---|---|---|
| No. | $\theta_2$ (deg) | a (mm) | Presence of cavity | The kind of metallic foil | Lamination of PET film of 15 μm thickness on both sides | drawing ratio | Wall-wrinkles | Remarks |
| 1 | 0 | 20 | Presence | IF 25 μm | laminated | 2.18 | ⊚ | Invented punches |
| | | | | IF 25 μm | laminated | 2.27 | ⊚ | |
| | | | | IF 25 μm | nothing | 1.91 | ⊚ | |
| 2 | 5 | 0 | Presence | SF 50 μm | laminated | 2.45 | ⊚ | |
| | | | | AlF 30 μm | laminated | 2.36 | ⊚ | |
| | | | | AlF 30 μm | nothing | 1.82 | ⊚ | |
| 3 | 10 | 20 | Presence | IF 25 μm | laminated | 2.27 | ⊚ | |
| 4 | 5 | 10 | Presence | IF 25 μm | laminated | 2.18 | ○ | |
| 5 | −5 | 20 | Presence | IF 25 μm | laminated | 1.95 | △ | Comparative punches |
| | | | | IF 25 μm | laminated | 1.91 | ⊚ | |
| | | | | IF 25 μm | nothing | 1.55 | ⊚ | |
| 6 | 5 | 20 | Nothing | SF 50 μm | laminated | 2.09 | ⊚ | |
| | | | | AlF 30 μm | laminated | 2.00 | ⊚ | |
| | | | | AlF 30 μm | nothing | 1.55 | ⊚ | |
| 7 | Rigid punch (FIG. 1 Dp = 55°) | | | IF 25 μm | laminated | 2.00 | X | |
| | | | | IF 25 μm | nothing | 1.64 | X | |

PET: Polyethylene terephthalate    good ⊚ ○ △ X poor
IF: Iron foil (manufactured by electroforming)
SF: Steel foil (manufactured by rolling)
AlF: Aluminum foil (manufactured by rolling)

We claim:

1. A drawing punch for use in drawing foils in a die which converges in the direction of drawing, comprising:
   a rigid core;
   a cylindrical elastic body on said core and surrounding said core, said body having a cavity therein around said core and opening out of the end of said body facing the direction of drawing;
   a rigid support member fixed on said core against which the other end of said body is supported;
   the radial cross-sectional area of said cylindrical elastic body increasing from the firstmentioned end of said body toward the other end;
   the peripheral surface of said cylindrical elastic body being at a positive angle to the axis of said punch of from 0° to 20°;
   said cavity having a volume just slightly less than the difference between the volume of the material of the elastic body in the uncompressed condition plus the volume of the cavity plus the volume of the rigid core and the volume of the die into which the punch is moved to draw the foil; whereby as said drawing punch is forced into the die for drawing a foil, the material of said elastic body is deformed into and fills said cavity, and thereby the friction between the die and the foil is effectively used to increase the drawing ratio.

2. The drawing punch as claimed in claim 1 wherein the diameter of said cylindrical elastic body at said firstmentioned end is almost as large as the diameter of the die mouth.

3. The drawing punch as claimed in claim 1 further comprising a rigid tool for forming a container bottom attached to the tip of said rigid core, said firstmentioned end of said body being freely movable along the surface of said tool which faces said firstmentioned end.

* * * * *